Patented Oct. 6, 1953

2,654,733

UNITED STATES PATENT OFFICE 2,654,733

ORGANIC AMMONIUM HYDROSULFIDE-HYDROGEN SULFIDE REACTION PRODUCTS AND METHOD FOR PRODUCING THE SAME

David E. Adelson, Berkeley, Calif., assignor to Shell Development Company, San Francisco, Calif., a corporation of Delaware No Drawing. Application August 1, 1949, Serial No. 108,066

12 Claims. (Cl. 260—125)

This invention relates to the provision of novel compounds which are reaction products of an organic material with an ammonium hydrosulfide-hydrogen sulfide reactant, as well as to the method by which said compounds are produced. These novel compounds are valuable lubricant additives, as disclosed in copending application Serial No. 718,617, filed December 26, 1946, now U. S. Patent No. 2,512,784, issued June 27, 1950, of which this application is a continuation-in-part, and many of them form useful rubber additives, as disclosed in copending application Serial No. 51,116, filed September 24, 1948, now U. S. Patent No. 2,564,404, issued August 14, 1951.

In general, the compounds of the present invention are of a viscous, oily nature, though some are solids, and they vary in color from light yellow to orange and dark brown. Their sulfur content is from about 0.4 to 25%, though containing no free sulfur. The compounds are substantially free of nitrogen introduced by way of reaction with the ammonium hydrosulfide-hydrogen sulfide reactant, any nitrogen found in said compounds (usually between 0.05 and 0.2%) being considered as attributable to impurities.

The ammonium hydrosulfide-hydrogen sulfide reactant referred to herein comprises the material which is preferably formed by first saturating a suitable solvent liquid with anhydrous ammonia and then saturating the resulting solution with hydrogen sulfide. In any event, even when the solution is not saturated with respect to one or both of the reactants, the hydrogen sulfide is always present in excess over the amount required to convert all the ammonia present to ammonium hydrosulfide.

As will be considered in greater detail in subsequent portions of the description, the organic material reacted with the ammonium hydrosulfide-hydrogen sulfide may be selected from a wide variety of compounds, though a preferred class of organic reactants for this purpose comprises the olefinically unsaturated hydrocarbons and alcohols, together with olefinically unsaturated acids, esters, ketones and other compounds containing a carbonyl group. Particularly valuable organic reactant compounds are the unsaturated fatty acid esters (including the natural oils, waxes and fats made up in major portion of said esters) as well as the higher unsaturated ketones containing 12 or more carbon atoms.

Whatever the nature of the organic reactant, it is a feature of the present invention to provide the novel compositions thereof by forming a solution containing the organic reactant and the ammonium hydrosulfide-hydrogen sulfide component and allowing this solution to react at room or other temperature not higher than about 100° C. for a period of at least several hours, it being noted that while the reaction progresses well at room temperature, it is greatly accelerated by heating. Thus, when the reaction is allowed to proceed at room temperatures it normally is completed in a period of from about 2 or 3 days to a month, though by heating at temperatures of from about 40 to 100° C. the reaction is in many cases brought to completion in from about 5 to 24 hours. At the end of the reaction period, the desired product is that which remains after removing the solvent and any remaining ammonia and hydrogen sulfide. In the preferred practice of the invention, anhydrous ammonia is first introduced into a suitable solvent such as ethanol, propanol, isopropanol, butanol, isobutanol, glycol, dioxane or the like until the solution is substantially saturated after which the solution is saturated with dry hydrogen sulfide, thereby forming ammonium hydrosulfide and providing an excess of hydrogen sulfide. The organic reactant may then be added to this solution in either its natural state or as the solute portion in the same or a different solvent from that employed with the ammonia and hydrogen sulfide. However formed, the resulting solution preferably is then again saturated with hydrogen sulfide, and wherever possible, an atmosphere of hydrogen sulfide is maintained over the solution during the reaction period.

The relative proportions of hydrogen sulfide, ammonia (or ammonium hydrosulfide) and organic reactant to be employed may be varied within relatively wide limits. However, the reactant solution preferably contains from about 0.2 to 5 moles hydrogen sulfide and at least 0.2 moles ammonia for each mole of organic reactant, there preferably being present an excess of at least about 10% of hydrogen sulfide over and above that necessary to convert the ammonia into ammonium hydrosulfide.

The organic material to be reacted with the ammonium hydrosulfide-hydrogen sulfide complex may be selected from a wide variety of compounds. However, a preferred group of organic reactants comprises the aliphatic and the alicyclic, olefinically unsaturated, carbonyl group-containing compounds, including carboxylic acids, esters, salts, aldehydes, ketones and the various natural oils, fats and waxes made up in major portion of said compounds, as well as the olefinically unsaturated alcohols and hydrocarbons which are oxidizable to form said carbonyl group-containing compounds. The term "olefinically unsaturated" is employed herein to designate those compounds having a double bond between at least one pair of adjacent carbon atoms of aliphatic character. Representative organic reactants which come within this preferred class are ethyl oleate, ethyl undecylenate, methyl ricinoleate, cottonseed oil, rapeseed oil, peanut oil, dehydrated castor oil, tall oil, the wax olefins, oleic acid, ammonium oleate, potassium oleate, ammonium undecylenate, mesityl oxide, isophorone, isophorone bottoms (the production and identification of which will be more fully described below), and the like. Also included within the foregoing preferred group of organic reactant compounds are those compounds such as stilbene, cinnamyl alcohol, ethyl cinnamate, cinnamaldehyde and the like, wherein one or more hydrogen atoms on the carbon atoms of the olefinically unsaturated compound are replaced by aryl groups.

A more preferred class of organic reactants comprises the unsaturated fatty acid esters and the natural oils, fats and waxes made up in major proportion of said esters. Compounds coming within this more preferred group are, for example, ethyl oleate, methyl oleate, ethyl undecylenate, methyl ricinoleate, ethyl linoleate and ethyl erucate, as well as such natural products as linseed oil, cottonseed oil, tung oil, animal fats, vegetable fats and tall oil.

Another more preferred class of organic reactants for use in the present invention comprises those aliphatic and cycloaliphatic, olefinically unsaturated ketones which contain at least 12, and preferably 15 or more, carbon atoms in the molecule. Such ketones are of the type obtained from the catalytic condensation of acetone either with itself or with compounds condensable therewith to form higher ketones, examples of the latter being the lower alcohols such as isopropyl, isobutyl and isoamyl alcohols. Thus, representative higher ketones may be prepared by condensing acetone in the presence of strong (30 to 60%) caustic at temperatures ranging from about 130 to 170° C. and at pressures of from 300 to 500 p. s. i., for example. Under favorable circumstances this condensation is productive, in the main, of isophorone, though at the same time various $C_{12}$ and higher unsaturated ketones are produced which remain as bottoms after the isophorone and the other lower boiling constituents have been distilled off. Such bottoms, termed "crude isophorone bottoms," may either be used as such in the formation of the ammonium hydrosulfide-hydrogen sulfide reaction products hereinafter described, or they may be fractionally distilled into various components which may be used individually or in combination. The $C_{12}$ fraction ($C_{12}H_{18}O$) boils within the range of approximately 112° C. to 123° C. (10 mm. Hg), a mixture of $C_{12}$ and $C_{15}$ ($C_{15}H_{22}O$) ketones boils from about 123° C. to about 142° C. (10 mm. Hg), whereas the $C_{15}$ ketones themselves boil within the range of about 140° C. to 175° C. (10 mm. Hg). A preferred mixture of unsaturated ketones, termed "topped, crude, isophorone bottoms" is that which remains in the still when crude isophorone bottoms are distilled until a still head temperature of approximately 140° C. (10 mm. Hg) is reached, the residue comprising, in the main, $C_{15}$ and higher unsaturated ketones. Isophorone bottoms may also be subjected to hydrolysis with dilute caustic after which the bottoms are separated from the acetone and isophorone formed during the hydrolysis step. The bottoms, which can then be filtered or otherwise purified, may be reacted as such with ammonium hydrosulfide-hydrogen sulfide, or they may first be fractionated in the manner described above and then reacted. As was the case with the crude bottoms, a preferred mixture of ketones is that remaining on distilling off the components of the hydrolyzed mixture which boil below 140° C. (10 mm. Hg). This residue is referred to herein as "topped, crude, hydrolyzed, isophorone bottoms" and is generally similar to topped, crude, isophorone bottoms, it being essentially made up of unsaturated alicyclic ketones having at least 15 carbon atoms in the molecule.

The term "isophorone bottoms," as employed herein, is intended to include all unsaturated alicyclic ketones produced according to the conditions of the foregoing paragraph which contain at least 12 carbon atoms in the molecule, whether topped or untopped, and whether hydrolyzed or unhydrolyzed, and which in general have the structural configuration of isophorone or a condensation product thereof.

Other alicyclic unsaturated ketones containing 12 or more carbon atoms and having a structure similar to that of the ketones comprising the isophorone bottoms, whether hydrolyzed or not, are prepared by the alkaline condensation of mesityl oxide. The latter compound (which may be prepared by condensing acetone into diacetone alcohol in the presence of soda lime and thereafter subjecting the alcohol to acid catalyzed dehydration) condenses in the presence of strong (e. g., 30 to 60%) caustic and at elevated temperatures and pressures to form, in the main, $C_{12}C_{18}O$, $C_{18}C_{26}O$ and higher molecular ketone units. The desired $C_{12}$ and higher ketones may be obtained from the mesityl oxide condensation product by topping the same (i. e., distilling off the lower boiling fractions) until a still head temperature of about 96° C. (4 mm. Hg) is reached. The residue (bottoms in the still) may then be used as such or it may be still further topped to a still head temperature of 160° C. (4 mm. Hg), at which point the main portion of the $C_{18}$ ketones begins to distill. The distillation may be carried still further, if desired, though a preferred practice is to employ the residue containing the $C_{18}$ and higher ketones for reaction with a sulfide to form the rubber additives of this invention.

All the higher ketones described above, whether of the isophorone bottom or the mesityl oxide condensate type, are alicyclic, olefinically unsaturated compounds which are well adapted to react with ammonium hydrosulfide-hydrogen sulfide to form the products of this invention. Such products are viscous, yellow to brown-colored masses containing from about 3 to 10% sulfur and substantially no nitrogen (i. e., less than about 0.2 to 0.3%).

The reaction products formed from higher ketones and ammonium hydrosulfide-hydrogen sulfide differ widely in both chemical and physical properties from compounds of the thioketone variety.

The following examples illustrate the present invention in various of its embodiments.

*Example I*

Isopropyl alcohol (700 cc.), at room temperature and contained in a thick-walled suction flask, was first saturated with dry ammonia and then with dry hydrogen sulfide. To this solution was added a solution of 238.5 grams of topped crude isophorone bottoms (crude isophorone bottoms topped to a still head temperature of 140° C. at 10 mm. Hg) in 350 cc. of isopropyl alcohol, after which the resulting solution was again saturated with dry hydrogen sulfide. The flask was then closed, the air therein being displaced with hydrogen sulfide, and allowed to stand for one week with infrequent shaking. Upon opening the flask a partial vacuum was discovered. The reaction mixture, containing the desired reaction product in solution in the isopropyl alcohol, was filtered to remove impurities and the isopropyl alcohol removed from the filtrate by vaporization over a steam bath. The residue obtained on evaporating the alcohol was then purified by dissolving the same in 500 cc. of a non-aromatic hydrocarbon having a boiling range of between about 164° F. and 233° F. and washing the resulting solution with water. After removal of the hydrocarbon solvent in a current of nitrogen gas on a steam bath, there was obtained a highly viscous, sticky mass which exhibited much less flow at room temperature than did the starting mixture. The product, which was oil-soluble, possessed a pleasant odor suggestive of crude molasses. On analysis, the product was found to contain 7.2% sulfur, 76.2% carbon, 9.6% hydrogen, 0.26% nitrogen and the balance, oxygen. Its molecular weight was 352.

In other operations conducted under the same conditions as indicated in the preceding paragraph but using topped, crude isophorone bottoms from other batches, products were obtained whose sulfur content varied from about 5% to 8.3%. In other respects these products were very similar to that described in the preceding paragraph.

*Example II*

This operation was conducted under the same general conditions as described in Example I except that here the quantity of higher ketone added was 243.5 grams and the reaction period was increased from 1 week to 1 month. The resulting product contained 8.3% sulfur, 76.7% carbon, 9.6% hydrogen, 0.2% nitrogen and 5.9% oxygen, and had a molecular weight of 360.

*Example III*

An unsaturated alicyclic ketone (260.5 grams), derived from the alkaline condensation of mesityl oxide and containing 18 or more carbon atoms in the molecule, was reacted with ammonium hydrosulfide-hydrogen sulfide under conditions similar to those described in Example I, while a companion operation was also conducted with respect to 258 grams of a like ketone fraction following saturation thereof by a hydrogenation treatment. The sulfide reaction product in the case of unsaturated ketone was found to contain 3.87% sulfur and 0.09% nitrogen whereas the product obtained using the saturated ketone contained 6.1% sulfur and 0.1% nitrogen.

*Example IV*

In the foregoing examples, the reaction was conducted at room temperatures. However, if desired, the reaction interval may be greatly reduced by retaining the reactants at elevated temperatures, e. g. those above 75° C., and at either atmospheric, superatmospheric or subatmospheric pressures. Thus, a solution of 295 grams of topped, crude isophorone bottoms in 1315 cc. isopropyl alcohol, containing ammonium hydrosulfide and saturated with hydrogen sulfide, was placed in an autoclave under a hydrogen sulfide atmosphere and there maintained at a temperature between 96 and 101.5° C. for a period of 5½ hours. At the end of this period, the reaction mixture was removed and the product recovered in the manner described in Example I. The product was found to contain 6.2% sulfur, 77.2% carbon, 9.6% hydrogen, 0.3% nitrogen and 6.5% oxygen, its molecular weight being determined as 356.

*Example V*

Pure isophorone (1, 1, 3-trimethyl-cyclohexene-3-one-5) was the reactant selected for use in this example. In carrying out the reaction, 700 cc. of isopropyl alcohol were saturated at room temperatures first with anhydrous ammonia and then with hydrogen sulfide, and to the resulting solution were added 138 grams of isophorone in 350 cc. of isopropyl alcohol, after which the solution was again saturated with dried hydrogen sulfide. The solution was placed in an enclosed reaction bomb formation where it was displaced by hydrogen sulfide and the mixture was allowed to react therein for a period of one week with occasional shaking. The desired reaction product, which was present in solution in isopropyl alcohol, was then recovered therefrom by distilling off the alcohol, leaving a viscous mass which was purified through solution in a hydrocarbon solvent and water washing, as described in Example I. There were finally obtained 89.3 grams of a viscous, dark brown liquid containing 26.4% sulfur, 63.5% carbon, 8.9% hydrogen, 0.9% oxygen and 0.2% nitrogen.

*Example VI*

Using the same procedure as outlined above in Example I, 53.6 grams of ethyl oleate were reacted with ammonium hydrosulfide-hydrogen sulfide to give 51.5 grams of product containing 4% sulfur and 0.1% nitrogen and having the appearance of an amber-colored oil, the refractive index $n$ 20/D of the oil being 1.4640.

*Example VII*

Mesityl oxide (147 grams) was reacted with ammonium hydrosulfide-hydrogen sulfide according to the conditions of Example I, there being produced 114.3 grams of a viscous, dark brown liquid containing 15.8% sulfur, as the product.

*Example VIII*

A mixture (223.6 grams) of unsaturated hydrocarbons (wax olefins) derived from the destructive distillation of petroleum and containing an average of 24 carbon atoms in the molecule, was reacted with ammonium hydrosulfide-hydrogen sulfide according to the method of Example I. The resulting product (223.6 grams) had a waxy appearance similar to that of the starting material, and contained 1.3% sulfur.

*Example IX*

Stilbene (18 grams) was reacted with ammonium hydrosulfide-hydrogen sulfide according to the method of Example I, there being obtained 17 grams of a product similar to stilbene in appearance, and which contained 0.71% sulfur.

*Example X*

Oleic acid (274 grams) was reacted with ammonium hydrosulfide-hydrogen sulfide according to the method of Example I. The resulting product, which weighed 265.4 grams and had the appearance of a viscous oil, contained 0.4% sulfur.

Example XI

Ammonium undecylenate (184 grams) was reacted with ammonium hydrosulfide-hydrogen sulfide according to the method of Example I. There were recovered 205.3 grams of an amber-colored oil having a refractive index $n\ 20/D$ of 1.4494 and containing 0.7% sulfur.

Example XII

Ethyl undecylenate (212 grams) was reacted with ammonium hydrosulfide-hydrogen sulfide according to the method of Example I, there being recoverd, as product, 199.1 grams of an amber-colored oil having a refractive index $n\ 20/D$ of 1.4398 and containing 0.9% sulfur.

Example XIII

Ethyl cinnamate (200 grams) was reacted with ammonium hydrosulfide-hydrogen sulfide according to the method of Example I. There were obtained 233.6 grams of a viscous, dark brown, liquid product containing 5% sulfur and having a refractive index $n\ 20/D$ of 1.5493.

Example XIV

Cottonseed oil (250 grams) was reacted with ammonium hydrosulfide-hydrogen sulfide according to the method of Example I. There were produced 187.7 grams of a viscous oil containing 0.9% sulfur, said oil having a refractive index $n\ 20/D$ of 1.4715.

Example XV

Rapeseed oil (250 grams) was reacted with ammonium hydrosulfide-hydrogen sulfide according to the method of Example I. There were produced 239.7 grams of a viscous oil containing 0.48% sulfur and having a refractive index of 1.4701.

Example XVI

Tall oil (250 grams) comprising a mixture of higher fatty oils and rosin acids and having an initial sulfur content of 0.15%, was reacted with ammonium hydrosulfide-hydrogen sulfide according to the method of Example I. There were produced 269.7 grams of a dark brown, viscous oil having a refractive index $n\ 20/D$ of 1.4980 and containing 0.68% sulfur.

Example XVII

Cinnamyl alcohol (200 grams) was reacted with ammonium hydrosulfide-hydrogen sulfide according to the method of Example I whereby there were formed 177.9 grams of a yellow-brown, crystalline solid product. This produce contained 2.76% sulfur and 0.1% nitrogen.

Example XVIII

Cinnamaldehyde (200 grams) are reacted with ammonium hydrosulfide-hydrogen sulfide according to the method of Example I. There were produced 235.4 grams of a yellow-brown, brittle solid having the general appearance of rosin. It contained 19.19% sulfur.

The various parts and percentages employed herein are on a weight basis unless otherwise indicated.

The invention claimed is:

1. A novel composition of matter comprising a product obtained by reacting an olefinically unsaturated organic material with ammonium hydrosulfide-hydrogen sulfide at a temperature below about 100° C.

2. The composition of claim 1 wherein said organic material is a compound selected from the group consisting of olefinically unsaturated hydrocarbons, olefinically unsaturated alcohols and olefinically unsaturated compounds containing a carbonyl group.

3. The combination of claim 1 wherein said organic material contains at least 50% by weight of an unsaturated fatty acid ester.

4. The composition of claim 1 wherein said organic material is an olefinically unsaturated higher ketone containing at least 12 carbon atoms in the molecule.

5. The composition of claim 1 wherein said organic material is comprised of isophorone bottoms.

6. The method comprising treating an olefinically unsaturated organic material with ammonium hydrosulfide-hydrogen sulfide at a temperature below about 100° C.

7. The method comprising reacting in a solvent an olefinically unsaturated organic material with ammonium hydrosulfide-hydrogen sulfide at a temperature between about room temperature and 100° C. for a period ranging from about 5 hours to over one month.

8. The method of claim 7 wherein said organic material is selected from the group consisting of olefinically unsaturated hydrocarbons, olefinically unsaturated alcohols and olefinically unsaturated compounds containing a carbonyl group.

9. The method of claim 7 wherein said organic material contains at least 50% by weight of an unsaturated fatty acid ester.

10. The method of claim 7 wherein said organic material is an olefinically unsaturated higher ketone containing at least 12 carbon atoms in the molecule.

11. The method of claim 7 wherein said organic material is comprised of isophorone bottoms.

12. The method comprising saturating a solvent first with anhydrous ammonia and then with hydrogen sulfide, there being an excess of hydrogen sulfide in the resulting solution over the amount required to convert the ammonia therein to ammonium hydrosulfide, adding to said solution a quantity of an olefinically unsaturated organic material and then again saturating the solution with hydrogen sulfide, and maintaining the resulting solution at a temperature between about room temperature and 100° C. for a period ranging from about 5 hours to over one month.

DAVID E. ADELSON.

References Cited in the file of this patent

UNITED STATES PATENTS

| Number | Name | Date |
|---|---|---|
| 2,487,840 | Van Ess | Nov. 15, 1949 |
| 2,489,249 | Adelson | Nov. 29, 1949 |
| 2,551,579 | Berl | May 8, 1951 |

OTHER REFERENCES

Cavalieri et al., J. Am. Chem. Soc., vol. 67, pages 1783–6 (1945).

King et al., J. Am. Chem. Soc., vol. 68, pages 632–6 (1946).